US006485139B1

(12) United States Patent
Lavery et al.

(10) Patent No.: US 6,485,139 B1
(45) Date of Patent: Nov. 26, 2002

(54) INK-JET PRINTING PROCESS USING POLYMERIC BIGUANIDES

(75) Inventors: Aidan Joseph Lavery, High Wycombe (GB); Janette Watkinson, Manchester (GB); Tom Annable, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/831,986

(22) PCT Filed: Dec. 14, 1999

(86) PCT No.: PCT/GB99/04212

§ 371 (c)(1),
(2), (4) Date: May 15, 2001

(87) PCT Pub. No.: WO00/37258

PCT Pub. Date: Jun. 29, 2000

(30) Foreign Application Priority Data

Dec. 18, 1998 (GB) ............................................... 9827884

(51) Int. Cl.⁷ .................................................. B41J 2/01
(52) U.S. Cl. ......................... 347/101; 347/100; 347/105
(58) Field of Search ................................ 347/100, 101, 347/96, 99, 105; 428/195

(56) References Cited

U.S. PATENT DOCUMENTS 5,658,376 A * 8/1997 Noguchi et al. ............ 347/100
6,100,315 A * 8/2000 Kitamura et al. .......... 106/31.43
6,197,880 B1 3/2001 Nigam

FOREIGN PATENT DOCUMENTS

| EP | 0291214 A2 * | 11/1988 | ............ B41M/3/00 |
| EP | 0 291 214 | 11/1988 | |
| EP | 0 324 211 | 7/1989 | |
| EP | 0 485 079 | 5/1992 | |
| EP | 0485079 A1 * | 5/1992 | .......... A01N/47/44 |
| EP | 0 673 781 | 9/1995 | |
| GB | 702268 | 1/1954 | |
| GB | 1152243 | 5/1969 | |
| WO | WO 00/58107 | 10/2000 | |

* cited by examiner

Primary Examiner—Craig Hallacher
Assistant Examiner—Manish S. Shah
(74) Attorney, Agent, or Firm—Pillsbury Winthrop LLP

(57) ABSTRACT

An ink-jet printing process comprising the steps (a) and (b) in any order or simultaneously: (a) applying by means of an ink jet printer an ink to a substrate in a localised manner to form an image on the substrate; and (b) applying to the substrate a composition comprising a binder and a polymeric biguanide which has a repeat unit of Formula (1) or a salt thereof: wherein X and Y are the same or different and represent divalent organic linking groups.

25 Claims, No Drawings

INK-JET PRINTING PROCESS USING POLYMERIC BIGUANIDES

BACKGROUND OF INVENTION

The present invention relates to an ink jet printing method, to recording sheets, to compositions suitable for use in the preparation of recording sheets and to a set of liquids suitable for use in an ink jet printer.

SUMMARY OF INVENTION

Ink jet printing (IJP) is a non-impact printing technique in which droplets of ink are ejected through a fine nozzle onto a substrate without bringing the nozzle into contact with the substrate. The images prepared by IJP desirably meet many demanding requirements. For example, they should be sharp and non-feathered and should also exhibit high water-fastness, light-fastness, humidity-fastness and optical density. Furthermore the recording sheets printed with the images are preferred to dry quickly so that sheets printed shortly afterwards do not smudge the image. The sheets preferably do not crack significantly, even when printed with pigment-based inks, and they should not markedly affect the shade or hue of the ink in such a way that an incorrectly coloured image results. The recording sheets ideally are not such that they stick together during storage or after printing.

We have found that the many of these demanding requirements can be satisfied by using the processes, compositions and recording sheets according to the present invention as described in more detail below.

European patent application No. 0 291 214 A2 describes an information device in the form of a substrate which carries concealed information which becomes detectable by suitably treating the substrate, e.g. by washing. The device could use a number of fixing agents used to write the concealed information, including polyhexamethylene biguanide ("PHMB").

SUMMARY

DETAILED DESCRIPTION OF INVENTION

According to a first aspect of the present invention there is provided an ink jet printing process comprising the steps (a) and (b) in any order or simultaneously:

(a) applying by means of an ink jet printer an ink to a substrate in a localised manner to form an image on the substrate; and (b) applying to the substrate a composition comprising a binder and a polymeric biguanide which has a repeat unit of the Formula (1) or a salt thereof:

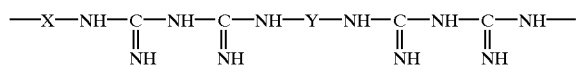

Formula (1)

wherein:

X and Y are the same or different and represent divalent organic linking groups.

X and Y are preferably each independently optionally interrupted alkylene, more preferably optionally interrupted $C_{2-12}$-alkylene and especially $C_{4-8}$-alkylene; arylene, more preferably $C_{6-10}$-arylene, especially phenylene; and aralkylene, more preferably $C_{7-11}$-aralkylene, especially benzylene or xylylene.

When X and Y are interrupted alkylene, they are preferably interrupted by —O—, —S—, —NH—, —C(=O)— or phenylene.

Examples of preferred alkylene groups represented by X and Y include —(CH$_2$)$_6$—, —(CH$_2$)$_8$—, —CH$_2$CH(-)(CH$_2$)$_4$CH$_3$, 1,4-2,3- and 1,3-butylene, 2,5-hexylene, 2,7-heptylene and 3-methyl-1,6-hexylene.

Examples of preferred interrupted alkylene groups represented by X and Y include —CH$_2$C$_6$H$_4$CH$_2$—, —CH$_2$OC$_6$H$_4$OCH$_2$—, —CH$_2$OC$_6$H$_{10}$OCH$_2$—, —(CH$_2$)$_3$O(CH$_2$)$_3$— and —(CH$_2$)$_2$S(CH$_2$)$_2$—.

It is especially preferred that X and Y are $C_{4-8}$-alkylene, more especially hexylene.

The nature of the terminating groups on the polymeric biguanide is not believed to be critical. However, preferred terminating groups include acyl, more preferably CH$_3$CO; H; optionally substituted alkyl, more preferably optionally substituted $C_{1-10}$alkyl; acyloxy, preferably —OC(O)(C$_{1-4}$alkyl); halo more preferably F or Cl; cyano; optionally substituted amino; a group of the formula:

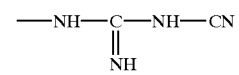

and optionally substituted phenyl. Preferred optional substituents on the terminating groups include $C_{1-4}$-alkyl, halo (especially Cl), nitro and $C_{1-4}$-alkoxy (especially methoxy). The terminating group at each end of the polymer may be the same or different.

The polymeric biguanide is typically in the form of a mixture of polymer chains, many or all of which are of different lengths. Preferably, the number of individual biguanide units in a polymer chain:

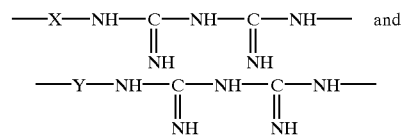

taken together, is from 3 to about 80.

In view of the foregoing preferences the polymeric biguanide preferably comprises one or more poly (hexamethylene biguanide) polymer chains in which the individual polymer chains, excluding the terminating groups, are of Formula (2) and salts thereof:

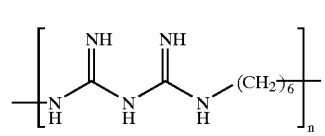

Formula (2)

wherein:

n is from 2 to 40.

n is preferably from 2 to 30, more preferably from 4 to 15.

When the polymeric biguanide is a mixture of poly (hexamethylene biguanide) polymer chains of the Formula (2) it is especially preferred that the average value of n in the mixture is 12.

Preferably, the number average molecular weight of the polymeric biguanide is from 1100 to 3300.

Preferably the polymeric biguanide is in the form of a salt. Preferred salts are those with organic or inorganic acids, especially water-soluble salts, for example the hydrochloride, gluconate or acetate salt.

The polymeric biguanides may be prepared by the reaction of a bisdicyandiamide of the formula:

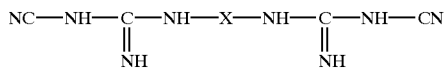

with a diamine of the formula $H_2N\text{—}Y\text{—}NH_2$; or by reaction between a diamine salt of dicyanimide having the formula:

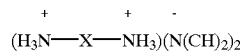

with a diamine of the formula $H_2N\text{—}Y\text{—}NH_2$ wherein X and Y are as hereinbefore defined.

These methods of preparation are described in more detail in GB 702,268 and GB 1,152,243 and any of the polymeric biguanides described therein may be used in the present invention.

The polymeric biguanide is preferably colourless, or substantially colourless.

The binder is preferably a polymeric binder, more preferably a water-soluble or water-dissipatable polymeric binder or a hydrophobic binder. Preferred water-soluble binders include starches, preferably hydroxy alkyl starches, for example hydroxyethylstarch; celluloses, for example celluslose, methylcellulose, hydroxyethylcellulose, hydroxypropylcellulose, hydroxyethyl methyl cellulose, carboxymethlycellulose (and salts thereof) and cellulose acetate butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N, N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth) acrylate monomers; amine-functional acrylic polymers and copolymers, for example polydimethylaminoethyl-methacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride); polyesters, preferably those which carry water-solubilising groups, especially sulphonic acid groups, for example polyesters obtainable by polymerising a polyol with sodiosulphoisophthalic acid.

The water-soluble binders are preferred over water-dissipatable binders due to their fast dry times and lower tendency to block the fine jets used in ink jet printers. A combination of water-soluble binders and water-dissipatable binders can also be beneficial in terms of improved mechanical strength, reduced tendency for sheets to stick together and good ink absorbency.

Preferred water-dissipatable binders are water dissipatable polymers, more preferably latex polymers, for example cationic, non-ionic and anionic styrene-butadiene latexes; vinyl acetate-acrylic copolymer latexes; acrylic copolymer latexes which carry quaternary ammonium groups, for example containing copolymerised dimethylaminoethyl (meth)acrylate; and dispersions of polyester, polyurethane, (meth)acrylate or vinyl polymers and copolymers thereof. The polymer dispersions are preferably prepared by emulsion polymerisation or by dispersion into water of polymers prepared by suspension, bulk or solution polymerisation.

The binder may comprise a single binder or a mixture of two or more of the hereinbefore defined preferred binders.

Overall particularly good results are found when the binder is methylcellulose (to give good mechanical properties), polyvinylpyrrolidone, polyvinylalcohol, polyacrylic acid (to give good ink absorbency) or a combination thereof to give the combined benefits mentioned above.

Preferably the weight ratio of the binder to the polymeric biguanide is from 99:1 to 1:99, more preferably from 60:40 to 15:85, especially from 50:50 to 20:80 and more especially from 30:70 to 20:80.

The binder may also contain further ingredients if desired, for example catalysts (e.g. to accelerate cross-linking of the binder), polymeric fillers (e.g. polymethylmethacrylate particles of 10 to 50 µm diameter), anti-kogation additives, cross-linkers, primers, drying-time accelerants, adhesion promoters, defoamers, surfactants, cationic or anionic salts (e.g. an inorganic acid or organic acid salt of an optionally substituted polyethyleneimine), whiteners and/or inorganic minerals (e.g. to entrap ink, such as silicates and aluminates) to name but a few.

Preferably the composition contains a cross-linker, preferably in an amount which causes from 0.1 to 5%, more preferably 0.15 to 4%, especially 0.2 to 2% crosslinking of the composition. These levels of crosslinking are preferred because they can result in enhanced mechanical strength without adversely affecting ink absorbing properties.

Suitable crosslinkers include salts of divalent and trivalent metals (e.g. calcium and magnesium acetate). These metals also offer the advantage of improving water-fastness of resultant prints.

Preferably the composition is applied to the substrate as a liquid. Accordingly it is preferred that the composition further comprises a liquid medium. The polymeric biguanide and binder are preferably dispersed or more preferably dissolved in the liquid medium. The liquid medium is preferably selected from water; an organic solvent; and a mixture of water and one or more water-soluble organic solvent(s).

The composition may be applied to the substrate using any convenient method, for example by dip coating, reverse roller coating, K-bar coating, spraying or by means of an ink jet printer.

Preferably step (b) of the process is performed before step (a) or simultaneously with step (a). It is especially preferred that the composition is applied to the substrate as a surface coating prior to forming the image by ink jet printing the ink.

When the composition is applied to the substrate prior to the ink it is preferred that the composition is dried and/or polymerised (e.g. cross-linked) before the ink is applied. Any suitable drying method may be used, for example hot air drying. Therefore in a preferred embodiement the process comprises step (b), followed by drying and/or polymersation of the product of step (a), followed by step (a).

The polymeric biguanide is preferably present on the substrate at a concentration of up to 20 $g \cdot m^{-2}$, more preferably up to 5 $g \cdot m^{-2}$, especially from 0.1 to 2 and more especially from 0.5 to 1 $g \cdot m^{-2}$.

When the composition of step (b) is applied to the substrate by means of an ink jet printer, the ink jet printer is preferably the same as that used to apply the ink to the substrate. In this embodiment the polymeric biguanide is preferably applied to the substrate just prior to, or simultaneously with, application of the ink. Preferably the ink jet printer used to apply the ink and polymeric biguanide has a nozzle or a series of nozzles in the printer which are dedicated to the application of the polymeric biguanide. Thus the printer may be of the 'five pen' type in which yellow, magenta, cyan and black are applied by four pens and the composition is applied by a fifth pen. A suitable ink jet printer and a method for its control is described in EP 657 849.

It is to be understood that in all ebodiments of the present invention the terms "ink", "colorant", "polymeric biguanide" and "binder" extend to two or more of these materials as well as one of them.

A preferred composition suitable for application to the substrate by means of an ink jet printer comprises:

(a) from 0.1 to 10 parts of a polymeric biguanide;

(b) from 0.1 to 10 parts of a binder;

(c) from 30 to 60 parts of a water-soluble organic solvent; and (d) from 35 to 80 parts water;

wherein all parts are by weight and the total number of parts (a)+(b)+(c)+(d)=100.

Preferred water-soluble organic solvents are selected from the list below in relation to liquid media for inks.

When the composition is applied to the substrate by means of an ink jet printer the composition preferably has a viscosity of less than 20 cP at 25° C.

Preferably the composition is transparent or colourless when dry.

The ink used in step (a) of the process preferably comprises a liquid medium and a colorant. Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-soluble organic solvent or a mixture of such solvents. Preferred water-soluble organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-soluble ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703, 113, U.S. Pat. No. 4,626,284 and EP 4,251,50A.

When the liquid medium comprises an organic solvent free from water, (i.e. less than 1% water by weight) the solvent preferably has a boiling point of from 30° to 20° C., more preferably of from 40° to 150° C., especially from 50 to 125° C. The organic solvent may be water-immiscible, water-soluble or a mixture of such solvents. Preferred water-soluble organic solvents are any of the hereinbefore described water-soluble organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Any colorant suitable for ink jet printing may be used in the ink. Preferred colorants are pigments which may be organic (including carbon black) or inorganic, disperse dyes and water-soluble dyes, more preferably water-soluble azo dyes.

The colorant preferably has one or more groups for imparting or assisting water-solubility/dispersibility. Examples of such groups include —COOH, —SO₃H, —PO₃H₂, morpholinyl and piperazinyl and salts thereof.

When the colorant is a pigment the ink preferably also contains a suitable dispersant to give a stable dispersion of the pigment in the ink. Preferably the particle size of the pigment used in the ink is less than 1 µm.

The ink may contain a single colorant or a mixture of two or more colorants.

The colorant is preferably present in the ink at a concentration of 0.5 to 20 parts, more preferably from 1 to 15 parts and especially from 1 to 5 parts by weight based upon the weight of the ink.

The ink may also contain additional components conventionally used in ink jet printing inks, for example viscosity and surface tension modifiers, corrosion inhibitors, additives to prevent paper curl, biocides, kogation reducing additives, dispersants and surfactants which may be ionic or non-ionic.

In a first preferred embodiment of the present invention the colorant has at least two groups selected from —COOH, —PO₃H₂, morpholinyl and piperazinyl or salts thereof. More preferably the colorant has at least two groups selected from —COOH and —PO₃H₂ or salts thereof.

It is especially preferred that the colorant is a water-soluble dye which has at least two groups selected from —COOH, —PO₃H₂ morpholinyl and piperazinyl, or salts thereof. Preferred examples of such dyes include the dyes of the Formulae (3) to (8) and salts thereof, especially sodium, lithium and ammonium salts:

Formula (3)

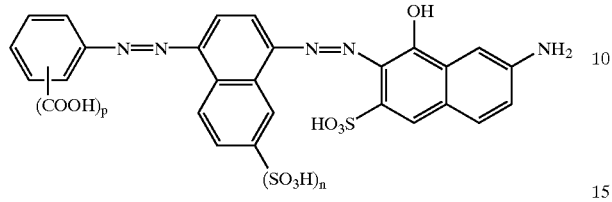

wherein:
n is 0 or 1; and
is 2;

Formula (4)

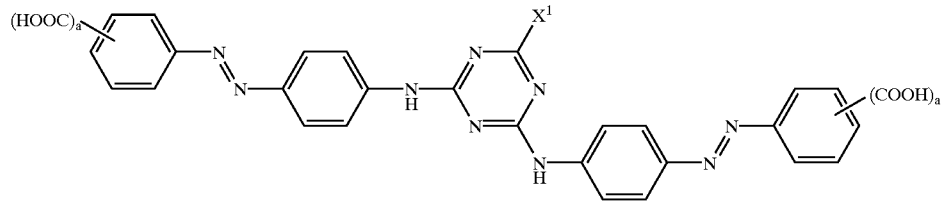

wherein:
X¹ is morpholinyl, piperazinyl or —NHR¹;
R¹ is optionally substituted alkyl (preferably optionally substituted $C_{1-8}$alkyl); and each a=2;

Formula (5)

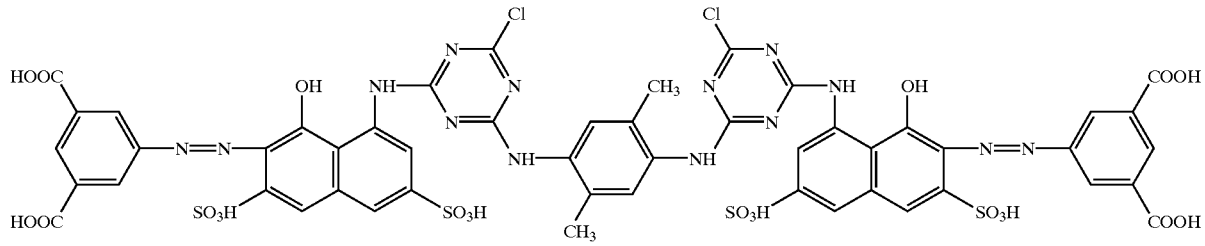

Formula (6)

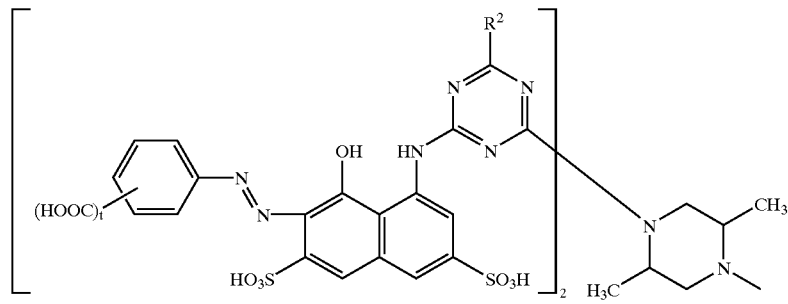

wherein:
each $R^2$ independently is alkoxy, —Cl, —OH or amino; and
each t=2;

Formula (7)

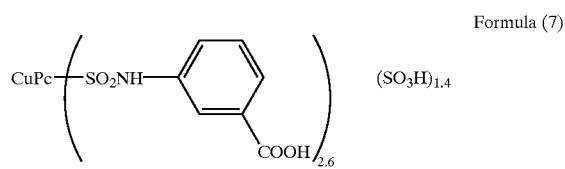

wherein CuPc is a copper phthalocyanine nucleus.

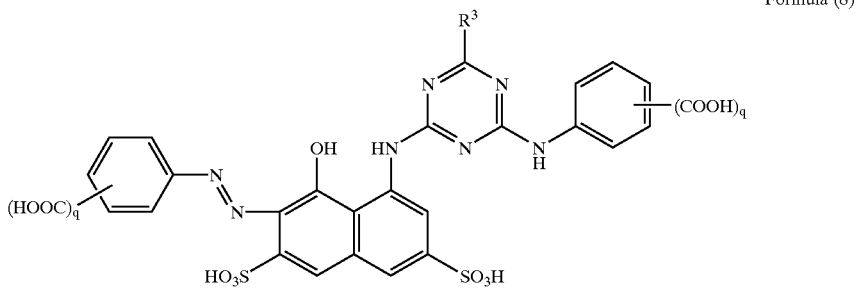

Formula (8)

wherein:

$R^3$ is —OH, —Cl, or $C_{1-4}$-alkoxy; and each q is 2.

In the dyes of Formulae (3), (4), (6) and (8) the —COOH is preferably meta to the azo group (—N=N—).

The compounds of Formula (3) may be prepared using methods analogous to those described in the art for similar disazo compounds. For example, as described in Examples 1 and 2 of EP 356 080.

The dyes of Formula (4) may be prepared using an analogous process to that described in Examples 10 and 15 of EP 468 647A.

The dye of Formula (5) may be prepared using a method analogous to Example 1 of EP 468 648, wherein in place of phenylenediamine there is used 2,5-dimethyl-1,4-phenylene diamine.

The dyes of Formula (6) may be prepared using a method analogous to that described in Example 3 of EP 679 173 B1.

The dyes of Formula (7) may be prepared using a method analogous to that described in Example 3 of EP 559 309 A2.

The dyes of Formula (8) may be prepared using conventional techniques, for example, using the method described on pages 17 and 18 and Example 1 of EP 0 628 088.

Preferred pigments which have at least two groups selected from —COOH, —PO$_3$H$_2$ morpholinyl and piperazinyl, or salts thereof include derivatives of pigments from the azo, disazo, condensed azo, thioindigo, indanthrone, isoindanthrone, anthanthrone, anthraquinone, isodibenzanthrone, triphendioxazine, quinacridone and phthalocyanine series of pigments.

Preferred carbon black pigments in this first preferred embodiment comprise carbon black particles onto which are attached organic groups which carry one or more groups selected from —COOH, —PO$_3$H$_2$ morpholinyl and piperazinyl, or salts thereof. Examples of such carbon black pigments are disclosed in U.S. Pat. No. 5,803,959 and U.S. Pat. No. 5,630,868.

We have found that when inks which contain a colorant with at least two groups selected from —COOH, —PO$_3$H$_2$, morpholinyl and piperazinyl, or salts thereof are used in step (a) of the present process, the resulting prints exhibit a reduction in colour-to-colour bleed and a high light-fastness compared to prints prepared without the polymeric biguanide of step (b).

In view of the forgoing preferences a particularly preferred ink comprises:

(a) from 0.5 to 20 parts of a water-soluble dye containing at least two groups selected from —COOH, —PO$_3$H$_2$, morpholinyl and piperazinyl;

(b) from 50 to 98 parts water; and (c) from 2 to 50 parts of water-soluble organic solvent(s);

wherein all parts are by weight and the sum of the parts (a)+(b)+(c)=100.

Preferably the ink contains less than 500 ppm, more preferably less than 250 ppm, especially less than 100 μm, more especially less than 10 ppm in total of divalent and trivalent metal ions. The content of halide ions in the ink is preferably below 500 ppm. 'ppm' means parts per million by weight relative to the total weight of ink.

The ink jet printer preferably applies the ink (and optionally the polymeric biguanide) to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper or a plastic film (especially a transparent film, for example an overhead projector slide). It is especially preferred that the substrate is paper, a textile or a transparent film.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

Preferred plastic films are transparent polymeric films, especially those suitable for use as overhead projector slides, for example polyesters (especially polyethylene terephthalate), polycarbonates, polyimides, polystyrenes, polyether sulphones, cellulose diacetate and cellulose triacetate films.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The prints obtained using the process also exhibit low colour bleed, high print quality and, in some cases, higher light-fastness compared to prints prepared without the polymeric biguanide. Furthermore, the application of the polymeric biguanide does not markedly affect the shade or hue of the ink and does not result in the discoloration of the printed substrate.

According to a second aspect of the present invention there is provided a substrate printed with an image by means of the process according to the first aspect of the invention. The preferred substrates are as hereinbefore defined in relation to the first aspect of the present invention.

Preferably the image is colour image comprising at least two colours, more preferably a colour image derived from a digital camera or a scanner. For example the image may be derived from a file in the .jpg. .jpeg, .tif, .tiff, .pcx, .psp, .pdf, .acc, .fdf, .art, .bmp, .dcx, .fpx, .gif, .mic, .mix, .png, .xws, .pbm, .pgm, .ppm, .pnm, .tga, .xif or .xbm file format.

According to a third aspect of the present invention there is provided a recording sheet comprising a substrate bearing on at least one surface thereof a composition comprising a polymeric biguanide and a binder. Preferably the composition in this third aspect of the invention is in a form of a layer obtained by a process comprising drying and/or polymerising a composition comprising a liquid medium, a polymeric biguanide and a binder (a layer obtained in this way being hereinafter abbreviated as a "Biguanide Layer"). The Biguanide Layer may be the sole layer of a of a single layer coating on the substrate, or more preferably a layer which forms part of a multi-layer coating on the substrate.

The preferred substrates, polymeric biguanides and binders for use in the third aspect of the invention are as defined in the first aspect of the present invention. It is especially preferred that the substrate is plain paper, treated paper or a transparent plastic film.

Preferably the recording sheet is white or transparent.

When the recording sheet bears the composition in the form of a multi-layer layer coating the Biguanide Layer may be at any position of the multi-layer coating, for example it may optionally be the inner-most layer in direct contact with the substrate, the outer-most layer, a layer between the inner-most and outer-most layers, or Biguanide Layers may be present at two or more of such positions. When the outer-most layer is not a Biguanide Layer the layers which are further away from the substrate than the Biguanide Layer should be permeable or porous to allow ink to come into contact with the Biguanide Layer. In all cases it is however preferred that a Biguanide Layer is present as the outer-most layer (i.e. the layer furthest away from the substrate) because this ensures good contact with inks during ink jet printing.

Preferably the recording sheet bears a thin (preferably 0.1 to 9.9 $\mu$m thickness) outer Biguanide Layer and a thick (preferably 10 to 50 $\mu$m thickness) inner layer which does not contain a biguanide. In this way rapid dry times and good dye fixation may be achieved as well as reducing the likelihood of the layer 'cracking' compared to when the combination of thick and thin layers is not used. The thick inner layer may be prepared from binders exactly as described above for the Biguanide Layer except that the biguanide is omitted.

The recording sheet preferably has a thickness of from 10 to 1000 $\mu$m, more preferably from 50 to 500 $\mu$m. The substrate preferably has a thickness of from 9 to 990 $\mu$m, more preferably from 49 to 499 $\mu$m. The coating, whether single- or multi-layered, preferably has an overall thickness of from 0.1 to 50 $\mu$m, more preferably from 5 to 30 $\mu$m, especially from 10 to 20 $\mu$m.

The composition is preferably applied to the substrate by the methods described above in relation to the first aspect of the invention.

The recording sheets may be used as ink receptive sheets in a wide range of printing processes, especially ink jet printing. They are able to provide excellent quality images, often of near photographic quality, having good wet-fastness, light-fastness, gloss and low sticking and cracking properties. The resultant prints usually good optical density, even with black pigment inks which often suffer from a drop in optical density, an unsightly grey appearance and poor image quality when printed onto conventional recording sheets. The humidity fastness is also good. Furthermore the sheets benefit from good storage stability with a low tendency to bacterial decay over time. When the polymeric biguanides are used as a top layer for recording sheets without the binder the sheets often stick together during storage, particularly under humid conditions. Furthermore the polymeric biguanides are often water-soluble in their own right and even if they have an affinity for the dyes contained in inks this often does not help water-fastness much because the polymeric biguanide-dyes combination is itself readily water-soluble. By using the process of the present invention the binder firmly adheres the biguanide to the recording sheet and the problem of sheets sticking together is generally avoided.

According to a fourth aspect of the present invention there is provided a composition comprising a polymeric biguanide, a binder and optionally a liquid medium, wherein the polymeric biguanide is as defined in relation to the first aspect of the present invention. Preferred binders and liquid media are as hereinbefore described in relation to the first aspect of the present invention. It is especially preferred that the composition is suitable for use in an ink jet printer. Thus this composition is preferably as described above as being suitable for application to the substrate by means of an ink jet printer comprises. More preferably the composition has a viscosity of less than 20 cP, more preferably less than 10 cP, especially less than 5 cP, at 25° C. These low viscosity compositions are particularly well suited for application to substrates by means of ink jet printers having demanding criteria for the liquids they apply.

According to a fifth aspect of the present invention there is provided a set of liquids suitable for use in an ink jet printer comprising:

(a) a first liquid comprising:
  (i) 0.01 to 50 parts, more preferably 0.1 to 30 and especially from 0.5 to 10 parts of a polymeric biguanide as defined in the first aspect of the invention;
  (ii) 50 to 99.8, more preferably 60 to 80 parts of a liquid medium selected from water, one or more water-soluble organic solvents and a mixture of water and one or more water-soluble organic solvents; and
  (iii) 0.01 to 50, more preferably 0.01 to 40 and especially from 0.5 to 30 parts of a binder;
wherein all parts are by weight and the total number of parts (i)+(ii)+(iii)=100; and (b) a second liquid which is an ink comprising a colorant and a liquid medium.

The ink in the set of liquids according to the fifth aspect of the present invention preferably comprises:
  (i) from 0.5 to 20 parts of a colorant (preferably a water-soluble dye) containing at least two groups selected from —COOH, —PO$_3$H$_2$, morpholine and piperazine;
  (ii) from 50 to 98 parts water; and
  (iii) from 2 to 50 parts of water-soluble organic solvent(s);
wherein all parts are by weight and the sum of the parts (i)+(ii)+(iii)=100.

The preferred polymeric biguanide, colorants, water-soluble organic solvents and binders are as hereinbefore defined in the first aspect of the present invention.

The set according to the fifth aspect of the present invention is preferably housed in an ink jet printer, i.e. the invention also provides an ink jet printer comprising a printing mechanism and a set of liquids wherein the set of liquids is as defined in the fifth aspect of the present invention. The set of liquids may be contained in one or more than one cartridge present in an ink jet printer. The invention also provides an ink jet printer cartridge comprising a plurality of chambers and a set of liquids, wherein the liquids are contained in individual chambers of the ink jet printer cartridge and the set of liquids is as defined in the fifth aspect of the invention. The invention also provides an ink jet printer cartridge comprising a chamber and a composition, wherein the composition is contained in the chamber of the ink jet printer cartridge and the composition is as defined in the fourth aspect of the invention.

The invention is further illustrated by the following examples in which all parts are by weight unless specified otherwise.

EXAMPLE 1

Recording Sheet Bearing a Single Layer

A mixture of polyacrylic acid (7 parts), polyethyleneglycol (Mw~400, 1 part) and polyhexamethylenebiguanide hydrochloride ("PHMB", 2 parts) was prepared in aqueous solution (solids content=10% by weight) and coated onto Melinex™ D706 film (which carries a primer) using a Meyer bar. The coated film was dried at 80° C. for 3 minutes to give a recording sheet bearing a thick outermost Biguanide Layer having a coating weight of 10 g/m$^2$.

EXAMPLE 1A

Comparative

The method of Example 1 was repeated except that the PHMB was omitted.

EXAMPLE 2

Recording Sheet Bearing Multi-layers (Biguanide Layer Outer-most)

To a solution of polyacrylic acid (10% strength, 100 g) was added NeoCryl™ CX100 polyfunctional aziridine (0.1 g, from Avecia B. V.) and the resultant solution was applied to Melinex™ 535 polyester film using a Meyer bar and dried at 80° C. for 3 minutes to give a thick inner-most layer having a coat weight of 10 g/m$^2$. A thin outer-most Biguanide Layer comprising of a 75:25 mixture by weight of PHMB and methylcellulose (Methocel™ J5MS, from Dow Chemicals) was applied using a Meyer bar and dried at 80° C. for 3 minutes. The coat weight of the outer-most Biguanide Layer was 1 g/m$^2$.

EXAMPLE 3

Recording Sheet Bearing Multi-layers (Biguanide Layer between Inner-most and Outer-most Layers)

To the recording sheet prepared in Example 2 there was applied a layer comprising Neocryl™ BT70 (acrylic latex from Avecia B. V) using a Meyer bar. The sheet was dried at 80° C. for 3 minutes to give a coat weight of this outer-most layer of 1 g/m$^2$.

EXAMPLE 3A

Comparative with No Binder

The method of Example 2 was repeated except that the methylcellulose was omitted from the composition applied as the thin outer-most layer. In other words this outer-most layer was free from binder.

EXAMPLE 4

Ink Jet Printing

The recording sheets described in Examples 1, 1A, 2 and 3 were placed in the tray of a Hewlett-Packard HP 660C thermal ink jet printer containing the standard inks sold with the printer.

The inks contained in the printer were applied to the recording sheets to replicate an electronic copy of a photograph and the print definition was evaluated visually. Water resistance of the prints was evaluated by inclining the prints at an angle of 45°, dropping water (3 ml) through a pipette onto the images and assessing the water resistance visually. The results are shown in Table 1 below:

TABLE 1

| Example | Print Definition | Water resistance | Extent of Cracking | Stickiness |
|---|---|---|---|---|
| 1 | good | good | high | very low |
| 1A* | good | poor | high | very low |
| 2 | good | good | very low | very low |
| 3 | good | good | very low | very low |
| 3A | good | good | moderate | high |

Notes:
1) Example 1A contained no polymeric biguanide.
2) Example 3A contained no binder.

EXAMPLE 5

Inks A, B, C and D and Fixer A were prepared as follows:
Ink A
  3% Pro-Jet Fast Yellow 2™
  5% 2-pyrrolidone
  5% thiodiglycol
  2% Surfynol 465
  85% water
  Adjust to pH 9.5 with ammonia.
Ink B
  3% Pro-Jet Fast Magenta 2™
  5% 2-pyrrolidone
  5% thiodiglycol
  2% Surfynol 465
  85% water
  Adjust to pH 9.5 with ammonia.
Ink C
  3% Pro-Jet Fast Cyan 2™
  5% 2-pyrrolidone
  5% thiodiglycol
  2% Surfynol 465
  85% water
  Adjust to pH 9.5 with ammonia.
Ink D
  3% Pro-Jet Fast Black 2™
  9% 2-pyrrolidone
  9% thiodiglycol
  1% cyclohexanol.
  78% water
  Adjust to pH 9.5 with ammonia.
  Pro-Jet products were obtained from Avecia Inc., USA.

Fixer A

2% hydroxyethyl cellulose

5% PHMB

93% water

Adjust to pH 9.5 with ammonia.

Fixer A was put into one chamber and the coloured ink into another chamber of a trichamber Hewlett-Packard HP 660C thermal ink jet printer. The Inks and Fixer A were printed onto Champion Datacopy paper with Fixer A being applied immediately before the ink. In the control experiments Fixer A was omitted.

The water and light fastness of the resultant prints were evaluated as described below and the results are shown in Table 2.

Light-Fastness Assessment

The prints were dried and mounted, half covered, in an Atlas Ci35a weatherometer and irradiated for 100 hours. The prints were removed and the spectral coordinates of the exposed and covered portions were measured using an X-Rite™938 densitometer. These readings were used to calculate the colour difference (ΔE) following irradiation. A low figure for ΔE indicates low fading, i.e. high light-fastness.

Water-Fastness Assessment

The paper printed with the inks in the form of parallel bars was attached to a support at a 45° angle so that the parallel bars were in a horizontal direction. A pipette was then used to dispense 0.5 ml of distilled water (pH 6–7) onto the print at a position slightly above the top of the parallel bars, taking care to ensure the run down of water over the print was as close as possible to a right angle to the printed bars.

The run-down track formed by the water was assessed visually between the second and sixth printed bars against a scale of 1–10 where level 10 shows no run-down of dye and 1 shows severe run-down of dye. Thus a print with a high run-down value indicates a high water-fastness.

The run down test was performed 1 minute after printing.

TABLE 2

| Ink | Fixer A | Water-Fastness | Light-Fastness (ΔE) |
|---|---|---|---|
| Ink A | No | 8 | 26 |
| Ink B | No | 6 | 52 |
| Ink C | No | 7 | 15 |
| Ink D | No | 8 | 20 |
| Ink A | Yes | 10 | 23 |
| Ink B | Yes | 10 | 44 |
| Ink C | Yes | 10 | 11 |
| Ink D | Yes | 10 | 16 |

From Table 2 it can be seen that prints using Fixer A had a higher light and wet fastness than prints made without using Fixer A.

What is claimed is:

1. An ink jet printing process comprising the steps (a) and (b) in any order or simultaneously:

(a) applying by means of an ink jet printer an ink to a substrate in a localised manner to form an image on the substrate; and (b) applying to the substrate a composition comprising a binder and a polymeric biguanide which has a repeat unit of the Formula (1) or a salt thereof:

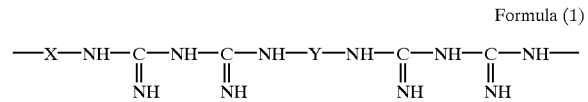

Formula (1)

wherein:

X and Y are the same or different and represent divalent organic linking groups.

2. A process according to claim 1 wherein X and Y are each independently optionally interrupted alkylene.

3. A process according to either claim 1 or claim 2 wherein the polymeric biguanide comprises one or more poly(hexamethylene biguanide) polymer chains in which the individual polymer chains, excluding the terminating groups, are of Formula (2) and salts thereof:

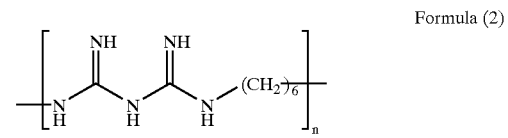

Formula (2)

wherein:

n is from 2 to 40.

4. A process according to claim 3 wherein the polymeric biguanide is a mixture of poly(hexamethylene biguanide) polymer chains in which the average value of n in the mixture is 12.

5. A set of liquids suitable for use in an ink jet printer comprising:

(a) a first liquid comprising:

(i) 0.01 to 50 parts of a polymeric biguanide;

(ii) 50 to 99.8 of a liquid medium selected from water, one or more water-soluble organic solvents and a mixture of water and one or more water-soluble organic solvents; and (iii) 0.01 to 50 parts of a binder;

wherein the parts are by weight and the total number of parts (i)+(ii)+(iii)=100; and (b) an ink comprising a colorant and a liquid medium.

6. An ink jet printer comprising a printing mechanism and a set of liquids wherein the set of liquids is as defined in claim 5.

7. An ink jet printer cartridge comprising a plurality of chambers and a set of liquids, wherein the liquids are contained in individual chambers of the ink jet printer cartridge and the set of liquids is as defined in claim 5.

8. A process according to either claim 1 or claim 2 wherein the polymeric biguanide is in the form of a water-soluble salt.

9. A process according to either claim 1 or claim 2 wherein the binder is a water-soluble or water-dissipatable polymeric binder.

10. A process according to either claim 1 or claim 2 wherein the composition further comprises a liquid medium.

11. A process according to either claim 1 or claim 2 wherein the composition is applied to the substrate before or during ink-jet printing of the ink.

12. A process according to either claim 1 or claim 2 wherein the composition is applied to the substrate by means of an ink-jet printer.

13. A process according to claim 12 wherein the composition has a viscosity of less than 20 cP at 25° C.

14. A process according to either claim 1 or claim 2 wherein the ink contains less than 500 ppm in total of divalent and trivalent metal ions.

15. A process according to claim 14 wherein the colorant has one or more groups selected from —COOH, —PO$_3$H$_2$, morpholinyl and piperazinyl or salts thereof.

16. A process according to either claim 1 or claim 2 wherein the ink comprises a liquid medium and a colorant with at least two groups selected from —COOH, —PO$_3$H$_2$, morpholinyl and piperazinyl or salts thereof.

17. A substrate printed with an image by means of the process according to either claim 1 or claim 2.

18. A recording sheet comprising a substrate bearing on at least one surface thereof a composition comprising a polymeric biguanide and a binder, wherein the polymeric biguanide has a repeat unit of the Formula (1) or a salt thereof:

Formula (1)

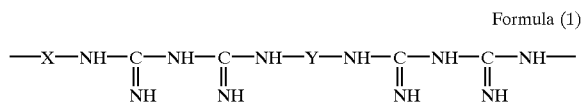

wherein:

X and Y are the same or different and represent divalent organic linking groups.

19. A recording sheet according to claim 18 wherein the composition is in the form of a layer obtained by drying and/or polymerizing a composition comprising a liquid medium, a polymeric biguanide and a binder.

20. A recording sheet according to claim 19 wherein the layer is the sole layer of a single layer coating on the substrate, or a layer which forms pat of a multi-layer coating on the substrate.

21. A recording sheet according to either claim 19 or claim 20 wherein said layer is present as the outermost layer of a multi-layer coating on the substrate.

22. A composition comprising a polymeric biguanide, a binder and a liquid medium comprising water and water soluble organic solvent, wherein the polymeric biguanide has a repeat unit of the Formula (1) or a salt thereof:

Formula (1)

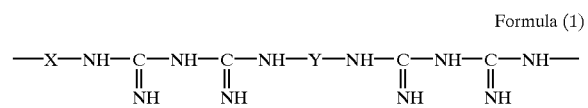

wherein:

X and Y are the same or different and represent divalent organic linking groups.

23. An ink-jet printer cartridge comprising a chamber and a composition, wherein the composition is contained in the chamber of the ink-jet printer cartridge and the composition is as defined in claim 22.

24. A recording sheet according to claim 18, wherein in Formula (1), X and Y are each, independently, alkylene, which may, optionally, be interrupted.

25. A composition according to claim 22, wherein in Formula (1), X and Y are each, independently, alkylene, which may, optionally, be interrupted.

* * * * *